US011368445B2

(12) United States Patent
Alwen et al.

(10) Patent No.: US 11,368,445 B2
(45) Date of Patent: Jun. 21, 2022

(54) LOCAL ENCRYPTION FOR SINGLE SIGN-ON

(71) Applicant: Amazon Technologies, Inc., Seattle, WA (US)

(72) Inventors: Joël Alwen, Vienna (AT); Thomas Michael Leavy, River Edge, NJ (US); Christopher Howell, Freehold, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 735 days.

(21) Appl. No.: 16/106,848

(22) Filed: Aug. 21, 2018

(65) Prior Publication Data

US 2019/0356649 A1    Nov. 21, 2019

Related U.S. Application Data

(60) Provisional application No. 62/674,202, filed on May 21, 2018.

(51) Int. Cl.
| | |
|---|---|
| *H04L 9/00* | (2022.01) |
| *H04L 9/40* | (2022.01) |
| *H04L 9/08* | (2006.01) |
| *H04L 9/32* | (2006.01) |
| *H04L 9/06* | (2006.01) |

(52) U.S. Cl.
CPC ........ *H04L 63/0815* (2013.01); *H04L 9/0643* (2013.01); *H04L 9/0822* (2013.01); *H04L 9/0861* (2013.01); *H04L 9/3218* (2013.01)

(58) Field of Classification Search
CPC .................................................. H04L 63/0815

USPC .......................................................... 713/155
See application file for complete search history.

(56) References Cited

U.S. PATENT DOCUMENTS

| | | | |
|---|---|---|---|
| 6,871,276 B1 * | 3/2005 | Simon ................. | H04L 63/0823 380/30 |
| 8,572,369 B2 * | 10/2013 | Schmidt-Karaca ....... | H04L 9/08 713/160 |

(Continued)

OTHER PUBLICATIONS

N. Sullivan et al. Hashing to Elliptic Curves. Mar. 5, 2018.
M. Sullivan et al. Verifiable Oblivious Pseudorandom Functions (VOPRFs). Mar. 5, 2018.

(Continued)

*Primary Examiner* — Christopher J Brown
(74) *Attorney, Agent, or Firm* — Davis Wright Tremaine LLP (57) ABSTRACT

The present disclosure describes techniques that allow for a client-side application, located on a first client device, to generate a random encryption key and encrypt locally-stored application data with the random encryption key. The random encryption key is used in lieu of a password-derived encryption key. In order to ensure that the client-device application is unable to decrypt the locally-stored encrypted application data prior to authenticating with an external authentication source (i.e., SSO, IdP), the random encryption key is encrypted with a key-encrypting key derived using a pseudorandom function (PRF). By using a PRF, the first device is able to authenticate to the first server and derive a secure key as part of the authentication process. Accordingly, the present disclosure describes techniques for securing data on a client device when credentials are managed by an external authentication system.

20 Claims, 10 Drawing Sheets

(56) References Cited

U.S. PATENT DOCUMENTS

| | | | |
|---|---|---|---|
| 8,813,247 B1* | 8/2014 | Alten | G06F 21/31 |
| | | | 726/28 |
| 9,985,782 B2* | 5/2018 | McCallum | H04L 9/0825 |
| 10,693,862 B1* | 6/2020 | de Boursetty | G06F 21/31 |
| 2003/0147536 A1 | 8/2003 | Andivahis et al. | |
| 2005/0114670 A1* | 5/2005 | Bowe | H04L 9/3247 |
| | | | 713/180 |
| 2006/0053285 A1* | 3/2006 | Kimmel | H04L 9/3247 |
| | | | 713/166 |
| 2015/0082411 A1* | 3/2015 | Hook | H04L 63/0823 |
| | | | 726/10 |
| 2018/0019870 A1* | 1/2018 | Scagnol | H04L 9/321 |
| 2019/0327222 A1* | 10/2019 | Hsu | H04L 63/166 |

OTHER PUBLICATIONS

F. Dierks et al. RFC 4346—The Transport Layer Security (TLS) Protocol Version 1.1. Apr. 2006.
U.S. Pat. No. 6,662,299, dated Dec. 9, 2003, Price, III.
U.S. Pat. No. 9,455,968, dated Sep. 27, 2016, Machani et al.
U.S. Pat. No. 10,289,835, dated May 14, 2019, Machani.
U.S. Publication No. 20100131755, dated May 27, 2010, Zhu et al.
U.S. Publication No. 20130290719, dated Oct. 31, 2013, Kaler et al.
U.S. Publication No. 20140180076, dated Jul. 3, 2014, Manickam et al.
U.S. Publication No. 20160180076, dated Jun. 23, 2016, Katieb.
U.S. Publication No. 20160285858, dated Sep. 29, 2016, Li et al.
U.S. Publication No. 20180083952, dated Mar. 22, 2018, Gummididala et al.
U.S. Publication No. 20180176222, dated Jun. 21, 2018, Bhaskar et al.

* cited by examiner

LOCAL ENCRYPTION FOR SINGLE SIGN-ON

CROSS-REFERENCE TO RELATED APPLICATIONS

This application claims priority to U.S. Provisional Application No. 62/674,202, entitled, "Local Encryption for Single Sign-On," filed May 21, 2018, the entirety of which is herein incorporated by reference. This application is also related to U.S. application Ser. No. 16/106,862, entitled, "Local Encryption for Single Sign-On," filed concurrently herewith, and issued as U.S. Pat. No. 10,911,431 on Feb. 2, 2021, the entirety of which is herein incorporated by reference.

BACKGROUND OF THE INVENTION

Figure 1A:
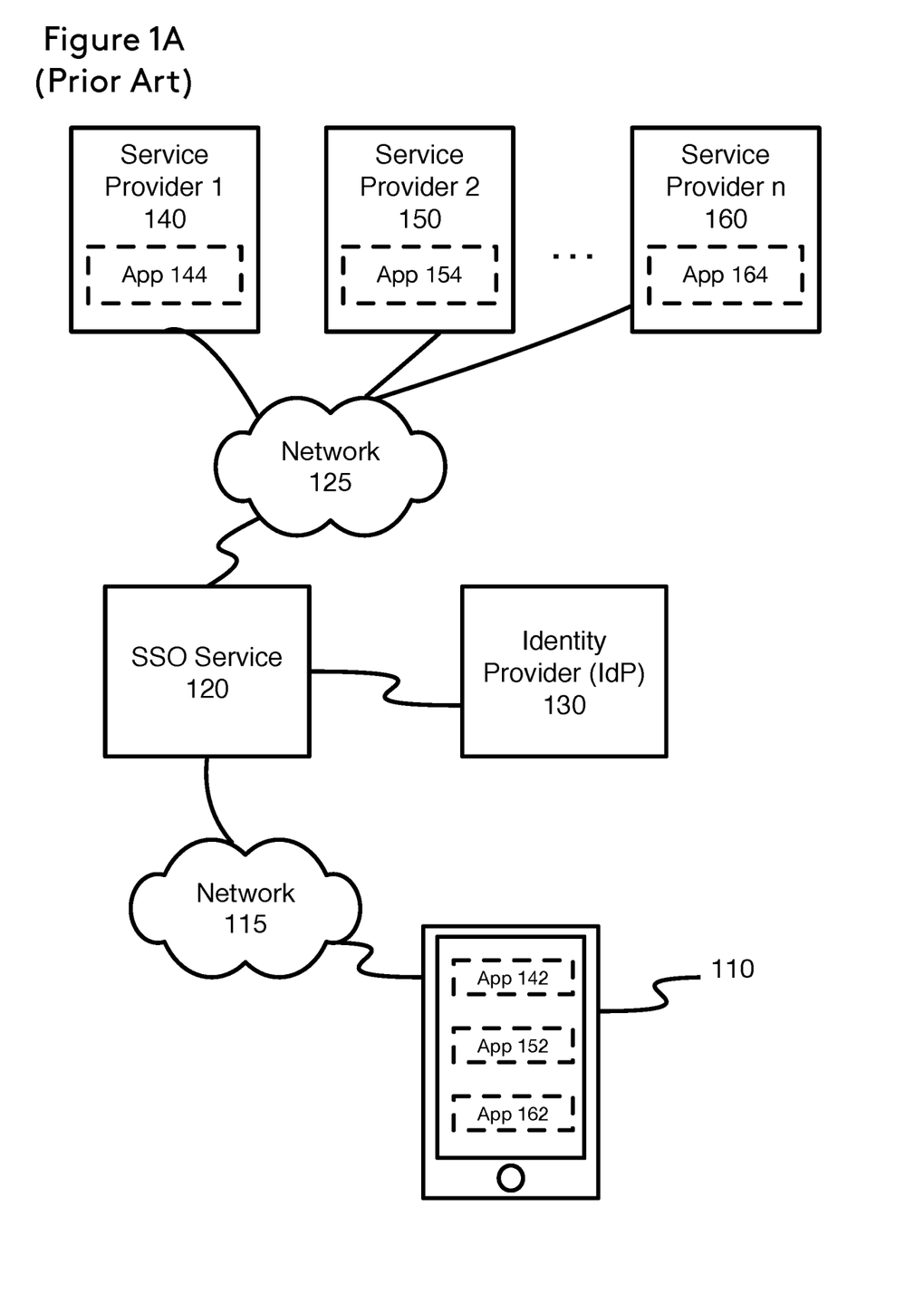
FIGS. 1A and 1B illustrate prior art examples of an SSO environment and logging-in and accessing one or more services using an SSO system.

Single Sign-On ("SSO") is a useful tool that allows users to use a single set of credentials to access a plurality of services, such as e-mail, messaging, office productivity (i.e. Microsoft® Office), and other applications and/or services. FIG. 1A shows a prior art example of an SSO arrangement.

In FIG. 1A, a first device 110, that includes a first client-side application 142, a second client-side application 152, and a third client-side application 162, connects to an SSO system 120 via network 115. SSO system 120 is connected to an identity provider ("IdP") 130. While SSO system 120 and IdP 130 are depicted as separate entities, one of ordinary skill in the art would recognize that the two services could be co-located on the same physical device or logically deployed in the same cloud environment. SSO 120 connects to a first service provider 140, a second service provider 150, and a third service provider 160 (collectively "the service providers"), each with their own server-side application (i.e., 144, 154, 164), via network 125. The service providers may either be located in a separate cloud service, the same network environment as SSO 120 and IdP 130, or any combination thereof.

Figure 1B:
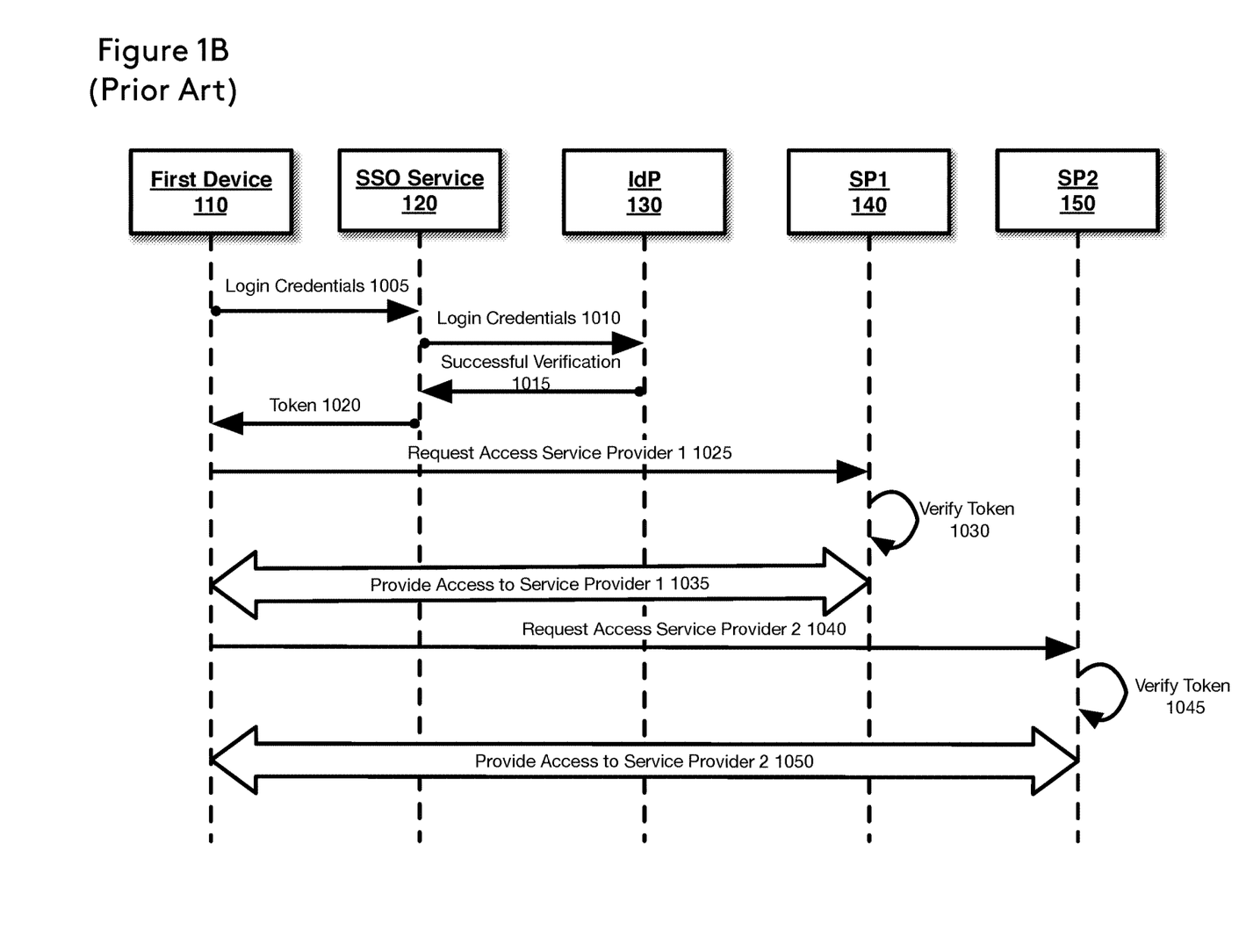

To make use of the various services and applications available through the SSO, the user of first device 110 authenticates the user's login credentials and provides access to the various server-side applications. FIG. 1B illustrates an exemplary process of an enterprise user accessing the plurality of services via SSO. The first device 130 begins at step 1005 by providing login credentials (i.e., a username and password of first user) to SSO system 120. SSO system 120 communicates with IdP 130, which includes directory services—such as Active Directory ("AD") or Lightweight Directory Access Protocol ("LDAP"), to authenticate the received login credentials in step 1010. When the login credentials are invalid, IdP 130 provides SSO system 120 with an indication that credentials are invalid and SSO system 120 denies the login request. However, when the login credentials are valid, IdP 130 provides SSO system 120 with an indication of the successful authentication in step 1015. SSO system 120, in turn, provides first device 110 with a token or certificate to access the plurality of services in step 1020. In lieu of a token or certification, SSO system 120 may act as a portal that hosts the plurality of services in some embodiments.

Once first device 110 has the token, first device 110 uses the token to access the plurality of services. For instance, in step 1025, first device 110 transmits the token to first service provider 140 ("SP1"). First service provider 140 verifies the token in step 1030. If the token is invalid, first service provider 140 provides first device 110 with access to the first server-side application 144 available via first service provider 140 in step 1035. This process can be repeated to access additional services, such as second service provider 150 ("SP2"). The token is transmitted in step 1040, verified in step 1045, and access is granted to the second server-side application 154 hosted by second service provider 150 when the token is valid.

This SSO arrangement has many benefits. For example, SSO allows network administrators to more easily manage user accounts by creating a single access point for adding and removing users. This makes onboarding and terminating employees quicker and more secure. Additionally, SSO reduces the effects of password fatigue—the pressure and exhaustion of remembering a multitude of passwords to access various services and resources.

While SSO includes a number of benefits, SSO includes a glaring security flaw when it comes to client-side application data on the first device. Namely, SSO makes it impractical for client-side applications data to be encrypted with a key derived from a user's password. In this regard, services and/or applications that execute on the enterprise user's first device generate an encryption key by using the enterprise user's password as an input to a password-based key derivation function. The generated encryption key encrypts client-side application data related to one or more services and/or applications. With SSO in place, encryption based on the user's password is impracticable because the client-side portion of the service and/or application no longer has access to the password. Instead, the enterprise user accesses the service and/or application via a token or certificate. Thus, the client-side portion of the service/application cannot generate the encryption key needed to encrypt client-side application data. Accordingly, there is a technical problem of securely generating and storing an encryption key and encrypting client-side application data when enterprise users log-in via an external authentication source, like SSO or IdP.

BRIEF SUMMARY OF THE INVENTION

The present disclosure describes techniques that allow for a client-side application, located on a first client device, to generate a random encryption key and encrypt locally-stored application data with the random encryption key. The random encryption key is used in lieu of a password-derived encryption key.

In order to ensure that the client-device application is unable to decrypt the locally-stored encrypted application data prior to authenticating with an external authentication source (i.e., SSO, IdP), the random encryption key is encrypted with a key-encrypting key. The key-encrypting key is derived according to a pseudorandom function (PRF). The PRF provides a level of authentication in addition to the benefits accorded by the key-encrypting key. In particular, PRF allows the first client device to authenticate the server. Accordingly, the present disclosure describes a solution for encrypting client-side application data when login credentials are managed by a trusted third party, instead of the application itself.

BRIEF DESCRIPTION OF THE DRAWINGS

Various embodiments of the invention are disclosed in the following detailed description and the accompanying drawings.

DETAILED DESCRIPTION

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The embodiments described herein with reference to the accompanying drawings, in which like reference numerals may refer to identical or functionally similar elements. Further, the terminology used herein is for the purpose of describing particular embodiments only and is not intended to be limiting of the disclosed embodiments. As used herein, the singular forms "a," "an," and "the" are included to include the plural forms as well, unless context clearly defines otherwise. It will be further understood that the terms "comprises" and/or "comprising," when used in the specification, specify the presence of stated features, integers, steps, operations, elements, and/or components, but do not preclude the presence of one or more additional features, integers, steps, operations, elements, and/or groups thereof.

Unless otherwise defined, all terms (including technical and scientific terms) used herein shall be given their plain and ordinary meaning as understood by one of ordinary skill in the art. It will be further understood that terms such as those defined in commonly used dictionaries, should be interpreted as having a meaning that is consistent with their meaning in the context of the relevant art and will not be interpreted in an idealized or overly formal sense unless expressly so defined herein.

The present invention may be embodied as a method, system, and/or as computer program instructions stored on a non-transitory computer-readable medium. Accordingly, the embodiments may take the form of hardware, software, or a combination thereof. Any suitable non-transitory computer-readable medium or processor-readable medium may be utilized including, for example, but not limited to, hard disks, USB Flash Drives, DVDs, CD-ROMs, optical storage devices, magnetic storage devices, etc. The instructions may be written in any suitable programming and/or scripting language, such as Java, C, C++, C#, Python, erlang, PHP, etc.

The disclosed embodiments are described, in part below, with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general-purpose computer, special-purpose computer, or other programmable data processing apparatus to produce a machine such that the instructions, which execute via the processor of the computer or other programmable data processing apparatus, create means for implementing the functions/acts specified in the block or blocks.

Note that the instructions described herein such as, for example, the operations/instructions and steps discussed herein, and any other processes described herein can be implemented in the context of hardware and/or software. In the context of software, such operations/instructions of the methods described herein can be implemented as, for example, computer-executable instructions such as program modules being executed by a single computer or a group of computers or other processors and processing devices. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, tablet computers, remote control devices, wireless handheld devices, Smartphones, mainframe computers, servers, and the like.

The term module, as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code or machine code that actually implements the routines in the module. The term module may also simply refer to an application such as a computer program designed to assist in the performance of a specific task such as word processing, accounting, inventory management, etc. Additionally, the term "module" can also refer in some instances to a hardware component such as a computer chip or other hardware.

Alternatively, each block, and/or combinations of blocks, may be implemented by special purpose hardware, software, or firmware operating on special or general-purpose data processors, or combinations thereof. It should also be noted that, in some alternative implementations, the operations noted in the blocks may occur in an order different from the one indicated in the figures. For example, two blocks shown in succession may in fact be executed substantially concurrently, or the blocks may sometimes be executed in the reverse order, or the varying embodiments described herein can be combined with one another or portions of such embodiments can be combined with portions of other embodiments in another embodiment.

Figure 2A:
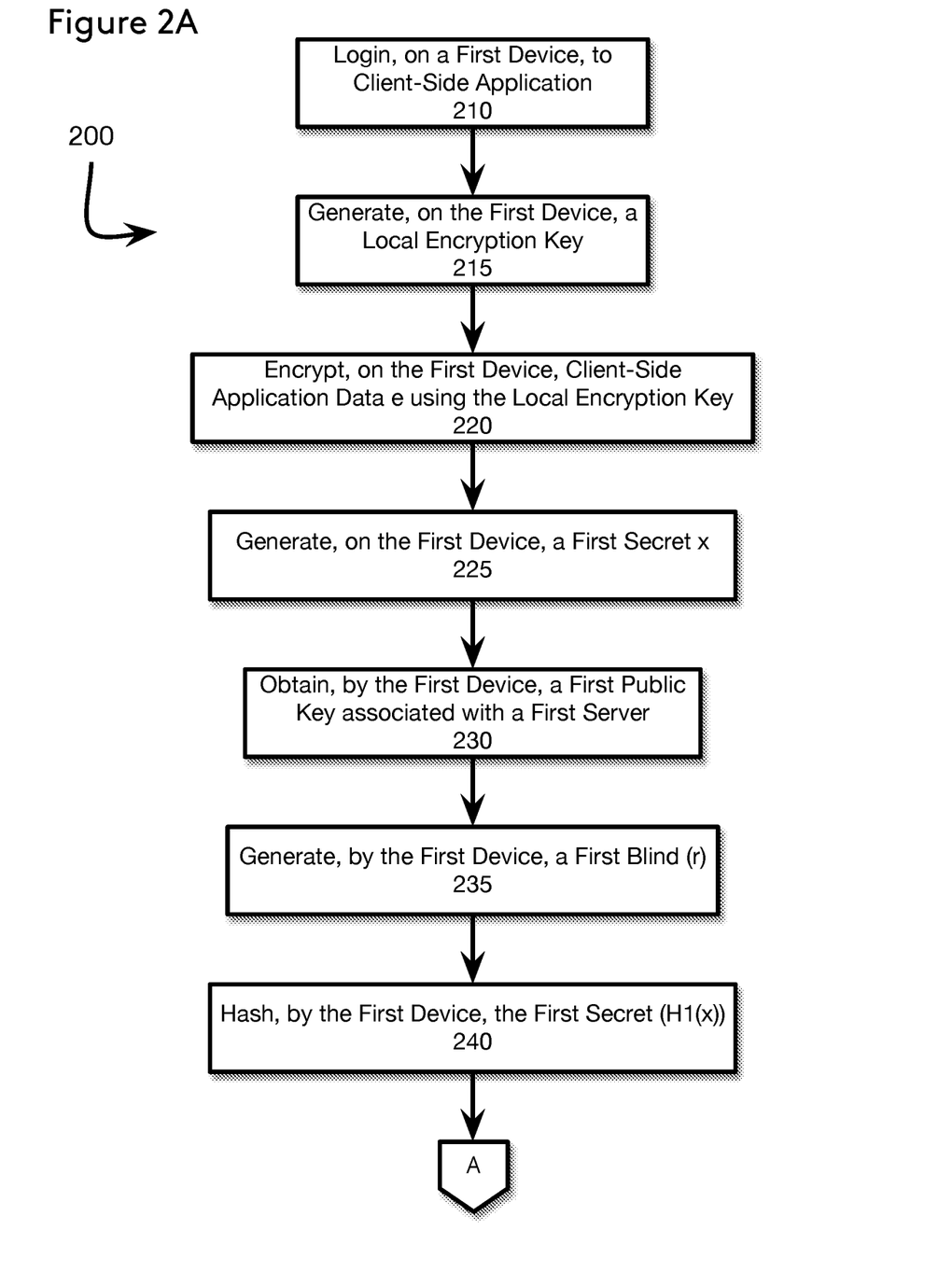
FIGS. 2A and 2B illustrate an exemplary process for securing client-side application data stored on a first device in accordance with an embodiment of the disclosure.
Figure 2B:
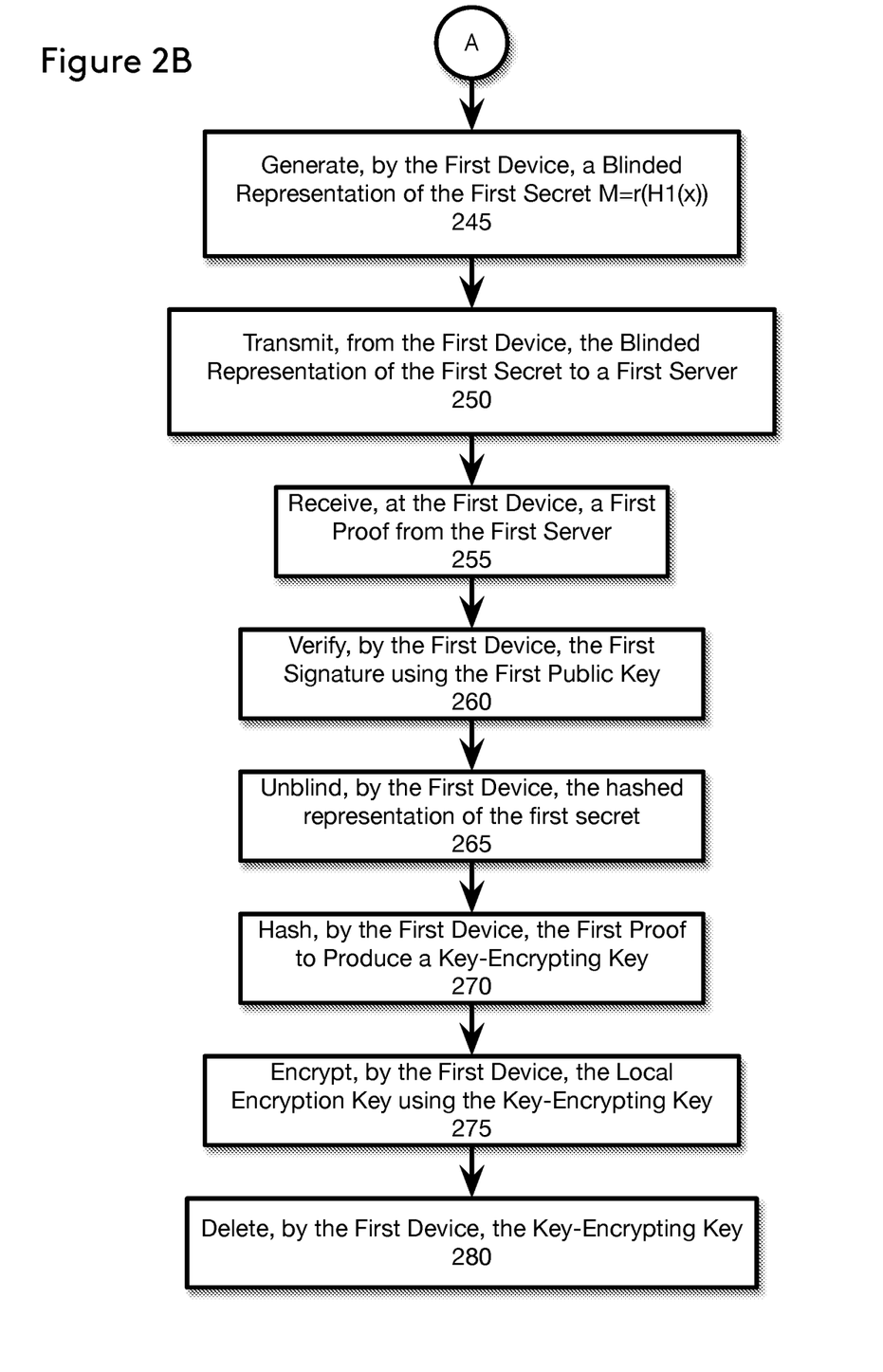

When a new application is provisioned by an enterprise, user accounts are created in the server-side application directory based on entries in the user directory maintained by the identity provider ("IdP"). Users log in to the newly provisioned application using their login credentials (i.e. username and password). The first time that a user logs in to the newly provisioned application, the client-side application generates a plurality of settings, preferences, and configurations. FIGS. 2A and 2B illustrates an exemplary process 200, performed by a client-side application, to secure client-side application data stored on a first device in accordance with an embodiment of the disclosure.

In block 210, process 200 begins with a user logging-in to the client-side application on a first device. Logging-in to the client-side application includes providing login credentials, such as a username and password or certificate, to the client-side application. The client-side application transmits the login credentials to the SSO system, which authenticates the received login credentials. When the login credentials are invalid, the SSO system denies the login attempt. When the SSO system determines that the login credentials are valid, the SSO system provides an indication to the client-side application that the authentication was successful and connects the client-side application on the first device to the server-side application. In an alternative embodiment, logging-in to the client-side application includes logging-in to the SSO system, which acts as a portal. The user provides his or her login credentials to the SSO system. When the login credentials are invalid, the SSO system denies the login attempt. However, when the login credentials are valid, the SSO system authenticates the user and displays a list of applications and services that the user is then allowed to access.

After validating the user's login credentials, process 200 proceeds to block 215 with the client-side application generating a local encryption key. In preferred embodiments, the local encryption key is generated from a pseudorandom string of bits greater than 256 bits. The client-side application selects 256 of the bits to use as the local encryption key. Alternatively, the client-side application generates the local encryption key using a key derivation function (KDF). In order to generate the local encryption key, the KDF may accept a plurality of inputs, including, for example, the pseudorandom string of bits, ephemeral noise generated by the first device, a hardware signature of the first device, one or more serial numbers of one or more device components, or any combination thereof. After generating the local encryption key, the client-side application encrypts client-side application data using the local encryption key in block 220. In preferred embodiments, the client-side application uses the local encryption key and a symmetric encryption algorithm—such as the Advanced Encryption Standard (AES), the Data Encryption Standard (DES), Triple-DES (3DES), etc. —to encrypt client-side application data. Client-side application data includes, for example, a database associated with the client-side application, user information, personal identifying information (PII), communications received via the client-side application, or any combination thereof. Encrypting client-side application data ensures that client-side application data is secure. Thus, if the client device is ever compromised (i.e., stolen, lost, hacked, etc.), the encrypted client-side application data will be in an unusable state to the malicious actor.

To prevent a malicious actor from being able to recover the encrypted client-side application data, the client-side application protects the local encryption key by encrypting the local encryption key with a key-encrypting key (KEK) derived according to a pseudorandom function (PRF). In preferred embodiments, the key-encrypting key is derived according to a verifiable oblivious pseudorandom function (VOPRF). The VOPRF begins in block 225 with the client-side application, executing on a first device, generating a first secret x. In preferred embodiments, the first secret x is generated using the PRNG. The first secret x may either be generated before the local encryption key, concurrently with the local encryption key, or after the local encryption key is generated. Next, in block 230, the client-side application obtains a first public key belonging to a first server. In preferred embodiments, the first public key is obtained from the first server as part of an enrollment process. Alternatively, the first public key is obtained from a trusted key distribution center (KDC). In further embodiments, the public key is embedded in the client-side application executing on the first device.

In block 235, the client-side application, executing on the first device, generates a first blind. In preferred embodiments, the first blind is a random scalar selected in a base field, such as a Galois Field. In block 240, the client-side application hashes the first secret using a first hashing algorithm. The first hashing algorithm is any suitable cryptographic hash algorithm that maps arbitrary input onto a prime order subgroup, such as a P-521 elliptic curve, over base field GF(p) for a prime value p. After generating the first blind and hashing the first secret x, the client-side application generates a blinded representation of the first secret in block 245. The blinded representation of the first secret is formed by combining the first blind and the hash of the first secret. Preferably, the first blind and the hash of the first secret are combined according to an arithmetic function. Alternatively, the first blind and the hash of the first secret can be combined in accordance with a Boolean operation. In block 255, the client-side application transmits the blinded representation of the first secret to a first server. The blinded representation of the first secret is transmitted to a first server over a secure channel, such as a channel secured by Transport Layer Security (TLS) or Secure Sockets Layer (SSL). Alternatively, the secure channel is secured by a proprietary encryption algorithm. In preferred embodiments, the first server is the SSO system. Alternatively, the first server is a service provider. That is, the PRF exchange may occur during an initial communication between the client-side application, located on the first device, and the server-side application, located on the service provider. In block 255, the client-side application receives a first proof from the server. The first proof is received in response to the blinded representation of the first secret transmitted by the first device. Details about how the server generates the first proof will be discussed in greater detail below, with respect to FIG. 3. In preferred embodiments, the first proof includes a first signature generated by applying a first private key to the blinded representation of the first secret.

In block 260, the client-side application verifies the first signature using the first public key. When the signature is invalid, the PRF exchange ends. However, when the signature is valid, the client-side application unblinds the hashed representation of the first secret in block 265. In preferred embodiments, the first blind is removed from the hashed representation of the first secret by multiplying the blinded representation of the first secret by an inverse of the first blind. In block 270, the client-side application derives a key-encrypting key (KEK) by applying a second hash function to the first proof and the hashed representation of the first secret. The second hash function is any suitable hashing algorithm, such as SHA256 or SHA512, that maps arbitrary input to a fixed-length output.

In block 275, the client-side application encrypts the local encryption key using the derived KEK. In preferred embodiments, the local encryption key is encrypted with a symmetric encryption algorithm, such as AES, DES, or 3DES. After the local encryption key is encrypted, the client-side application deletes the KEK from the first device in block 280. In preferred embodiments, the KEK is forensically deleted so that the KEK cannot be recovered from the first device and subsequently used to access the encrypted client-side application data.

In an alternative embodiment, the local encryption key is divided into a plurality of shares $(S_1, S_2, \ldots, S_n)$ such that any t of the shares may be used to reconstruct the local encryption key. For example, the Shamir Secret Sharing technique is used to divide the local encryption key into the plurality of shares. Using these techniques, t–1 of the plurality of shares would not reveal any information about the local encryption key. A first share $(S_1)$ is encrypted with a first key-encrypting key $(KEK_1)$ to produce a first ciphertext $(C_1)$. Each remaining share is encrypted with a unique key-encrypting key and distributed to one or more servers and/or secondary devices. For instance, a second share $(S_2)$ is encrypted with a second key-encrypting key $(KEK_2)$, a third share $(S_3)$ is encrypted with a third key-encrypting key $(KEK_3)$, and so on. At subsequent logins, the first device may contact the one or more servers and/or secondary devices to recover any subset of t. This would provide for a more robust system by allowing the first device to decrypt information on the first device even if one of the one or more servers and/or secondary devices suffered an outage.

Figure 3:
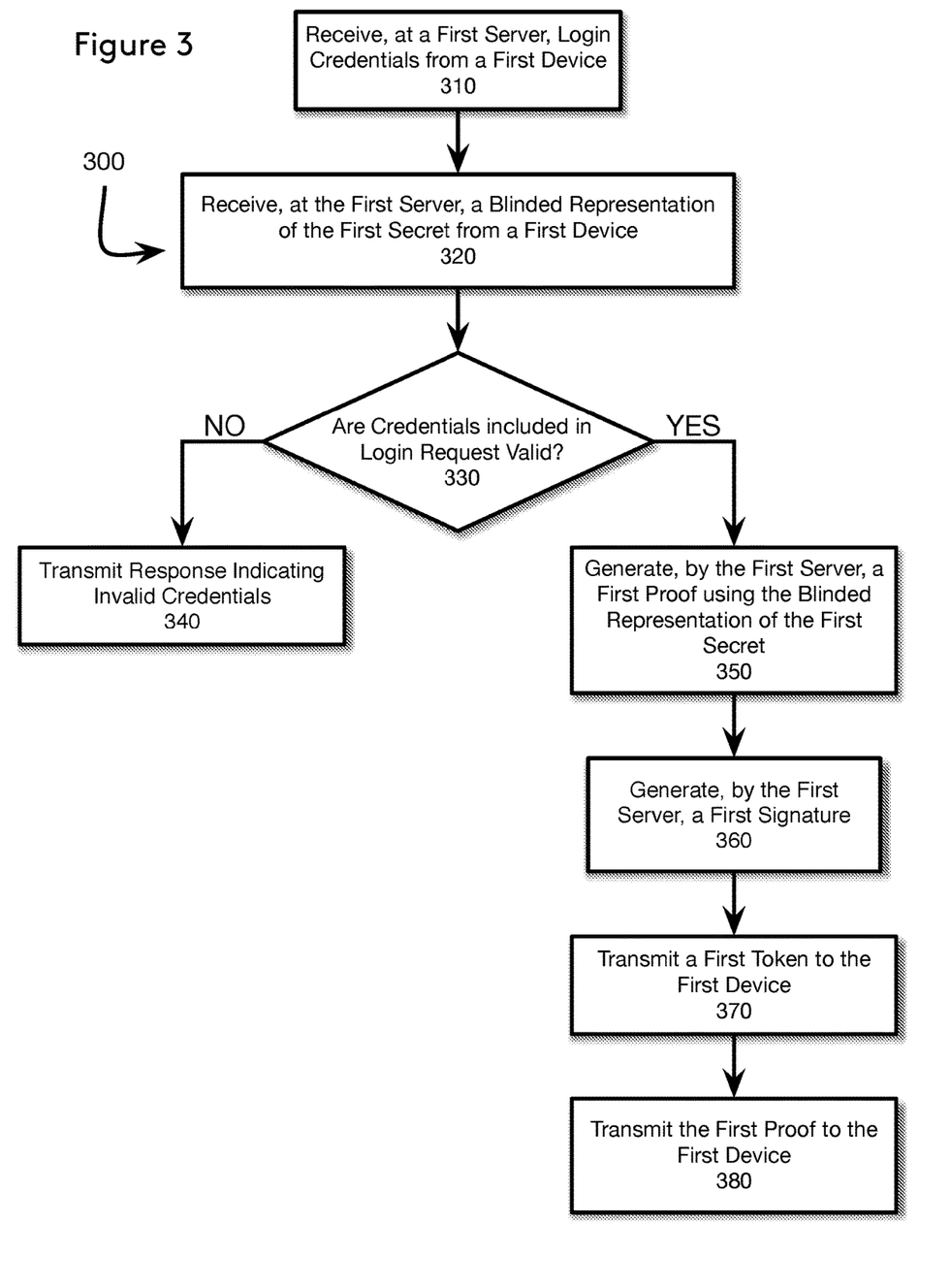
FIG. 3 illustrates an exemplary process for authenticating a first device and providing the first device with the first token and the components to derive the key-encrypting key.

When a new user account is provisioned, the server-side application takes steps to enable the client-side application's access to the functionality of the server-side application. FIG. 3 illustrates a server-side process 300 for authenticating a first device and provisioning the first device with the first token and components necessary to derive the key-encrypting key. In block 310, a first server receives a login request from a first device. In preferred embodiments, the first server is the SSO system and the login request includes login credentials. In alternative embodiments, the first server may be the IdP, a service provider, or any combination of the SSO system, the IdP, or a service provider. In block 320, the first server receives a blinded representation of the first secret from the first device. The blinded representation of the first secret may be received in the same transmission as the login request. Alternatively, the blinded representation of the first secret is transmitted in a separate communication, preferably after the login credentials.

In block 330, the first server determines whether the login credentials included in the login request are valid. When the first server is the SSO system, the SSO system transmits the login credentials to the IdP. The IdP compares the received login credentials with login credentials stored in the IdP's directory. The result of the comparison (i.e., valid or invalid) is transmitted from the IdP to the SSO system. When the SSO system and the IdP are co-located, the SSO system passes the login credentials to the IdP for verification.

When the credentials are invalid, process 300 proceeds to block 340, wherein the first server transmits a response to the first device indicating that the login credentials are invalid. However, when the credentials are valid, process 300 proceeds to block 350, wherein the first server generates a first proof using the blinded representation of the first secret. In preferred embodiments, the first server uses a non-interactive zero knowledge (NIZK) proof to prove to the first device that the first private key, held by the first server, is an exponent of both the first public key and the blinded representation of the first secret received from the first device. The "Zero Knowledge" property protects the server's PRF key from malicious clients. More specifically, it ensures the PRF key is not leaked to the client device as a side effect of the proof. If the PRF key were to be leaked, an attacker could run one login session honestly to extract the PRF key and then unilaterally derive all key-encrypting keys of any other honest devices that the attacker has access to with no further help from the server.

In block 360, the first server generates a first signature. In preferred embodiments, the first server generates the first signature by applying a signature generation algorithm to the blinded representation of the first secret using the first private key. In block 370, the first server transmits a first token to the first device. The first token is capable of authenticating the first device to one or more second servers for a predetermined amount of time. According to alternative embodiments, the first token authenticates the first device to one or more server-side applications located on the one or more second servers. In block 380, the first server transmits the first proof to the first device. As noted above, the first signature is included with the first proof. According to some embodiments, the first proof is transmitted in the same communication as the first token to improve the efficiency of the authentication process.

Figure 4A:
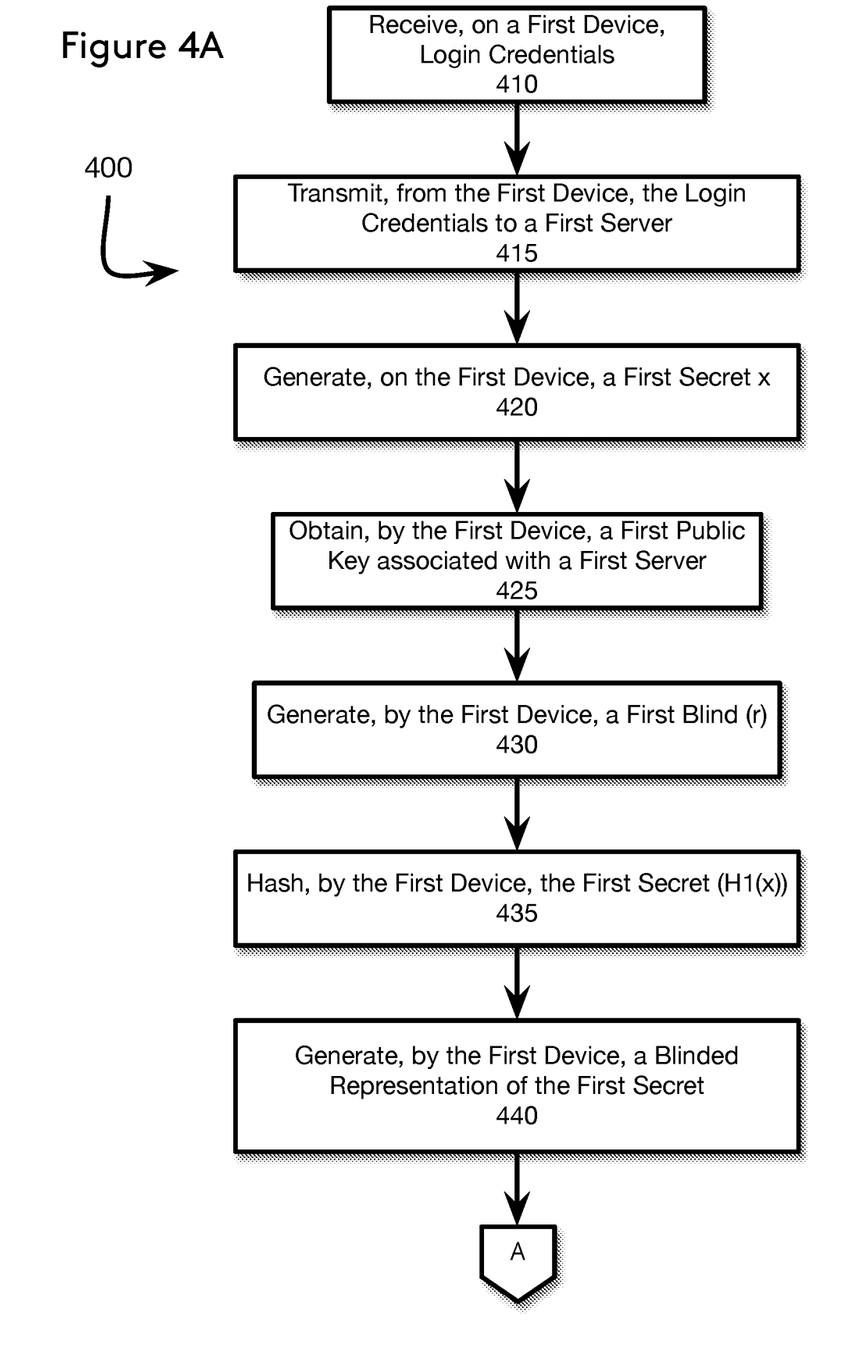
FIGS. 4A and 4B illustrate a subsequent login process according to one example of the disclosure.
Figure 4B:
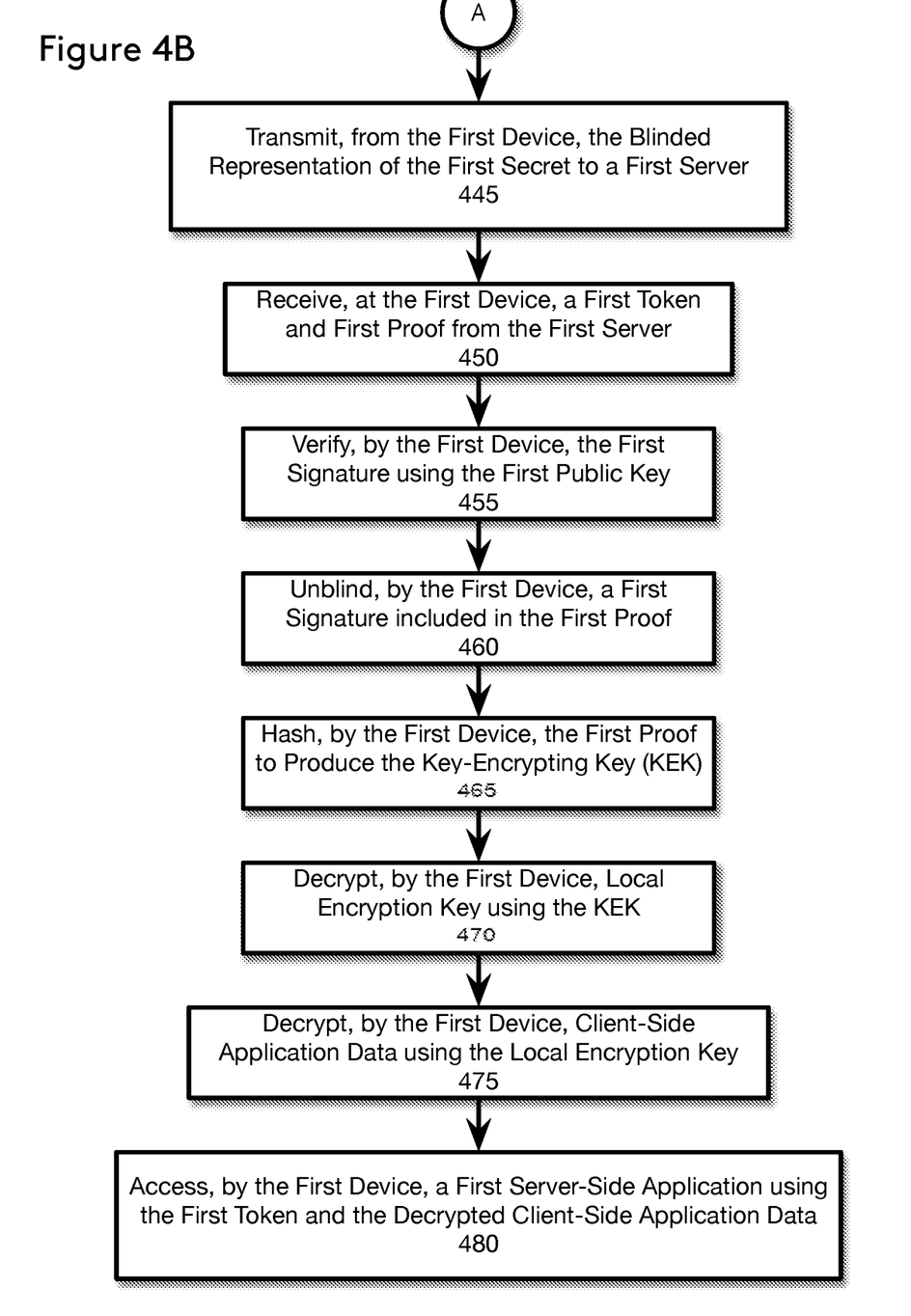

After the initial exchange between the first device and the first server, the PRF exchange is performed each time the first devices logs-in in order to decrypt the local encryption key used to encrypt client-side application data. FIGS. 4A and 4B illustrate a subsequent login process 400 according to one example of the disclosure In block 410, a first user logs-in to the client-side application on a first device by entering login credentials. Next, in block 415, the client-side application transmits the login credentials to a first server. In block 420, the client-side application generates the first secret x. Next, the client-side application obtains a first public key associated with a first server in block 425. Once the first public key is obtained, the client-side application generates a first blind in block 430. In block 435, the client-side application hashes the first secret using a first hashing algorithm. Once the first blind is generated and the first secret hashed, the client-side application generates a blinded representation of the first secret in block 440. In preferred embodiments, the blinded representation of the first secret is generated as $M=H1(x)^r$. In block 445, the client-side application, executing on the first device, transmits the blinded representation of the first secret to a first server. In block 450, the client-side application receives a first proof from the server. In block 455, the client-side application, executing on the first device, verifies the first signature using the first public key. When the signature is invalid, the PRF exchange ends. However, when the signature is valid, the client-side application unblinds the hashed representation of the first secret in block 460. In block 465, the client-side application derives a key-encrypting key by applying a second hash function to the first proof and the hashed representation of the first secret. In block 470, the client-side application decrypts the local encryption key using the derived KEK. In preferred embodiments, the local encryption key is decrypted with a symmetric encryption algorithm, such as AES, DES, or 3DES. In block 475, the decrypted local encryption key is used to decrypt client-side application data. In block 480, the client-side application, executing on the first device, uses the first token and the decrypted client-side application data to access the first server-side application. When the client-side application is closed, the first client-side application encrypts the local encryption key with the KEK and then forensically deletes the KEK.

Figure 5:
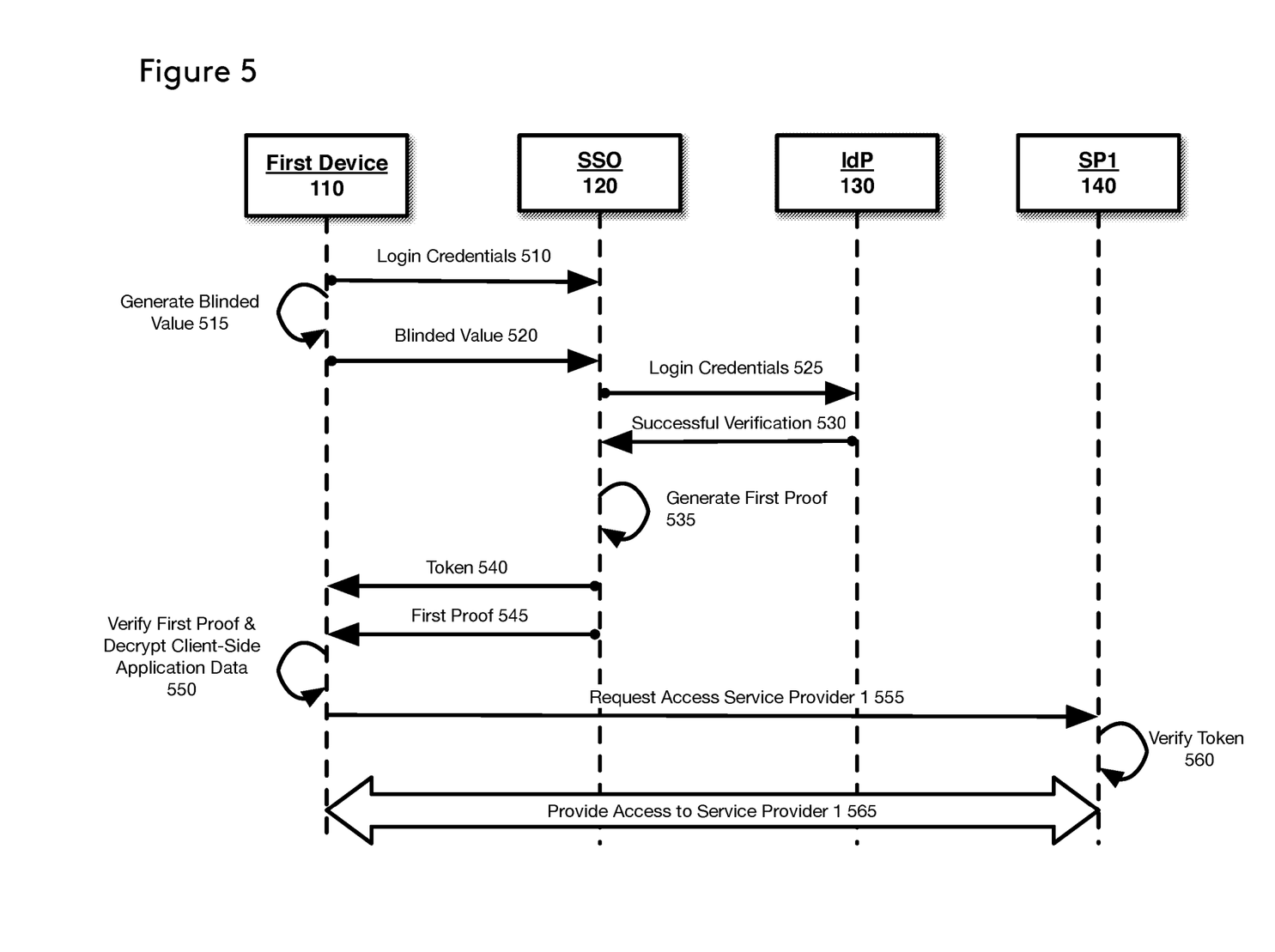
FIG. 5 shows a process for logging-in to an SSO system and accessing a first service provider.

Turning to FIG. 5, an exemplary exchange of information between the first device 110, the SSO system 120, the IdP 130, and the first service provider 140 is shown. In block 510, first device 110 transmits the login credentials to SSO system 120. In block 515, first device 110 generates the blinded value discussed above. In block 520, the blinded value is transmitted from first device 110 to SSO system 120.

In block 525, SSO system 120 forwards the login credentials to IdP 130, who will verify the received login credentials. When the login credentials are valid, IdP 130 provides an indication of successful verification to SSO system 120 in block 530. In response to valid credentials, SSO system 120 generates the first proof in block 535. SSO system 120 transmits the first token to first device 110 in block 540. Additionally, SSO system 120 transmits the first proof to first device 110 in block 545. As noted above, the first token and the first proof may be transmitted to first device 110 in a single transmission.

In block 550, first device 110 verifies the first proof and derives the key-encrypting key used to encrypt the local encryption key. First device 110 decrypts the local encryption key using the derived key-encrypting key and, subsequently, decrypts client-side application data with the decrypted local encryption key. In block 555, first device 110 requests access to first service provider 140 by transmitting the first token received from the SSO system 120 to first service provider 140. First service provider 140 verifies the first token in block 560. In preferred embodiments, first service provider 140 checks the veracity of the received first token with either SSO system 120 or IdP 130. Alternatively, first service provider 140 coordinates an authentication key with IdP 130 prior to receiving the verification token. If the authentication key included in the token received from first device 110 is valid, first service provider 140 authenticates the first token received from first device 110. Once the token is verified, first service provider 140 provides first device 110 with access to the services and/or application available via the first service provider in block 565. Accordingly, first device 110 uses the decrypted client-side application data to access the services and/or applications available via the first service provider.

Figure 6:
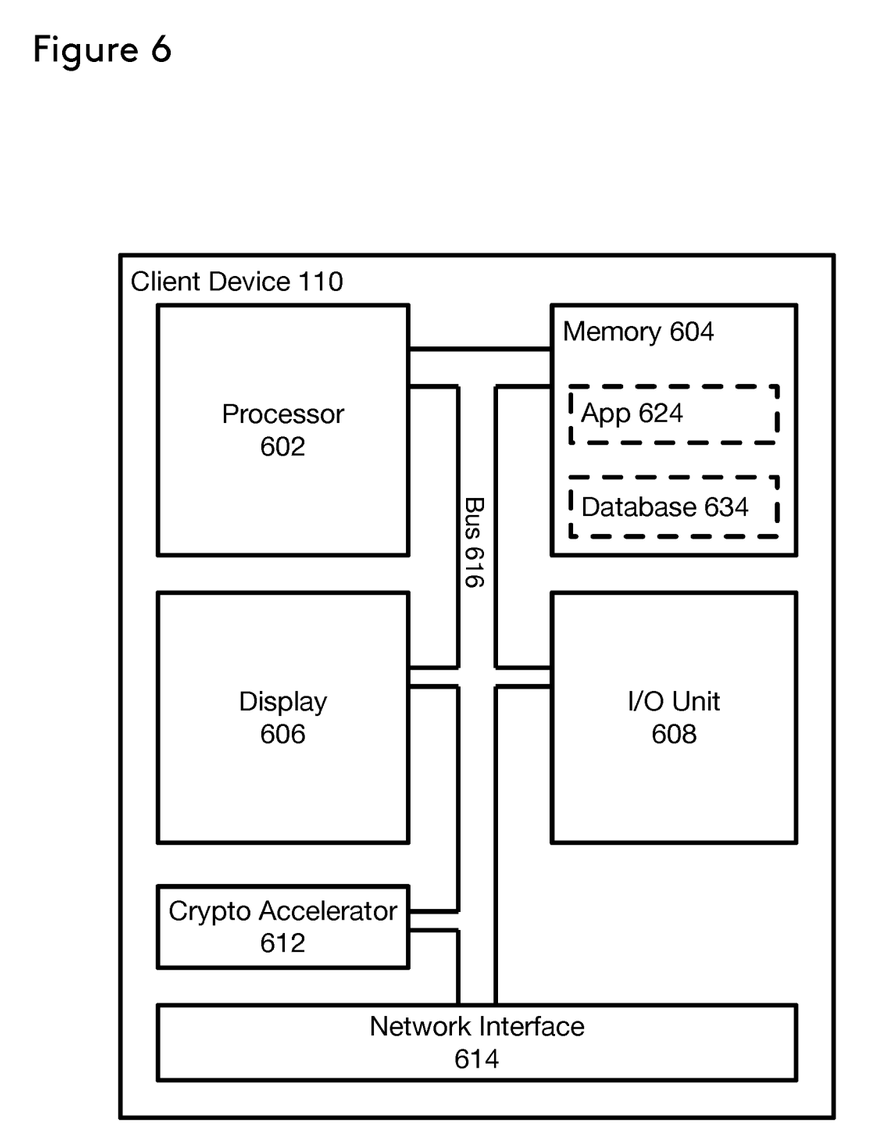
FIG. 6 illustrates an example of a client device in accordance with the present disclosure.

According to one embodiment, the client-side application is a secure collaboration application and the server-side application is the corresponding backend server functions to route communications and connect users. The client-side application executes on a client device, such as a mobile device, tablet, laptop computer, desktop computer, etc. FIG. 6 illustrates a client device 110 according to one aspect of the disclosure. In this regard, client device 110 includes at least a processor 602, a memory 604, a display 606, an I/O unit 608, a cryptographic ("crypto") accelerator 612, and a network interface 614 all interconnected by bus 616.

Processor 602 is any processor capable of interacting with the components of client device 110. For example, processor 602 may include a processor, multiprocessors, multicore processor, a dedicated controller, such as an ARM processor, an ASIC, or an FPGA, or any combination thereof. According to some examples, processor 602 is configured to generate a blinded representation of a first secret, verify a first proof received from a first server, unblind the blinded representation of the first secret, generate a key-encrypting key, and encrypt a local encryption key using the derived key-encrypting key. Processor 602 is also configured to generate the key-encrypting key in subsequent log-ins to decrypt the local encryption key, and, in turn, use the decrypted local encryption key to decrypt client-side application data.

Memory 604 stores information accessible by processor 602, including instructions and data that may be executed or otherwise used by the processor 602 and/or crypto accelerator 612. For example, memory 604 stores instructions, such as client-side application 624. In preferred embodiments, client-side application 624 is a secure collaboration application that provides users with the ability to participate in voice and video calls, share encrypted content, exchange encrypted communications, and share application data. Accordingly, the processes described herein are performed by the secure collaboration application executing on the first and second devices. The first and second devices include a plurality of hardware. In operation, the secure collaboration application and the hardware of the first device operate in conjunction to perform the processes described herein.

Data stored by memory 604 includes database 634. In preferred embodiments, database 634 is encrypted via an encryption algorithm, such as Advanced Encryption Standard (AES), and a 256-bit key, referred to hereinafter as a local encryption key. In some examples, database 634 stores client-side information related to secure collaboration application 624. For example, database 634 indexes information related to the secure collaboration application, such as key information (e.g. a user signing key, an application signing key, etc.), user information (e.g., username, application identifier, etc.), friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication stored in database 634. According to some embodiments, memory 604 stores a plurality of ephemeral keys received from a second user that would allow the first and second user to exchange encrypted communication peer-to-peer. Accordingly, memory 604 may be any type of media capable of storing the above information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 804 may include short-term or temporary storage, as well as long-term or persistent storage.

Display 606 is any electronic device capable of visually presenting information. In mobile devices, such as smart phones and tablets, display 606 may be a touchscreen display. Accordingly, display 606 is integrated with I/O unit 608 to detect user inputs, as well as output data. In computing devices, display 806 may be an output, such as a VGA, DVI, or HDMI output, configured to connect to a monitor.

I/O unit 608 may be configured to receive input from a user and output data to the user. As noted above, the I/O unit 608 may work with touchscreen displays to receive input from a user. Alternatively, the I/O unit is an interface capable of interacting with input and output devices, such as keyboards, mice, monitors, printers, etc. Additionally, I/O unit 608 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 612 may be dedicated hardware, software, firmware, or any combination thereof that is configured to perform cryptographic operations, such as key generation, random number generation, encryption/decryption, signature generation, signature verification, etc. In preferred embodiments, crypto accelerator 612 is a dedicated processor configured to perform cryptographic operations on behalf of processor 602. In this regard, client-side application 624 uses crypto accelerator 612 to perform cryptographic operations, including generating the local encryption key, deriving the key-encrypting key, and verifying signatures of received content.

Network interface 614 may be dedicated hardware, software, firmware, or any combination thereof that is configured to connect client device 110 to one or more devices via a communication network. In this regard, network interface 614 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 614 is configured to exchange data and information with at least one of a first server and a second server. The data and information may include login credentials, a token to access one or more second servers, and one or more components of the VOPRF exchange.

Figure 7:
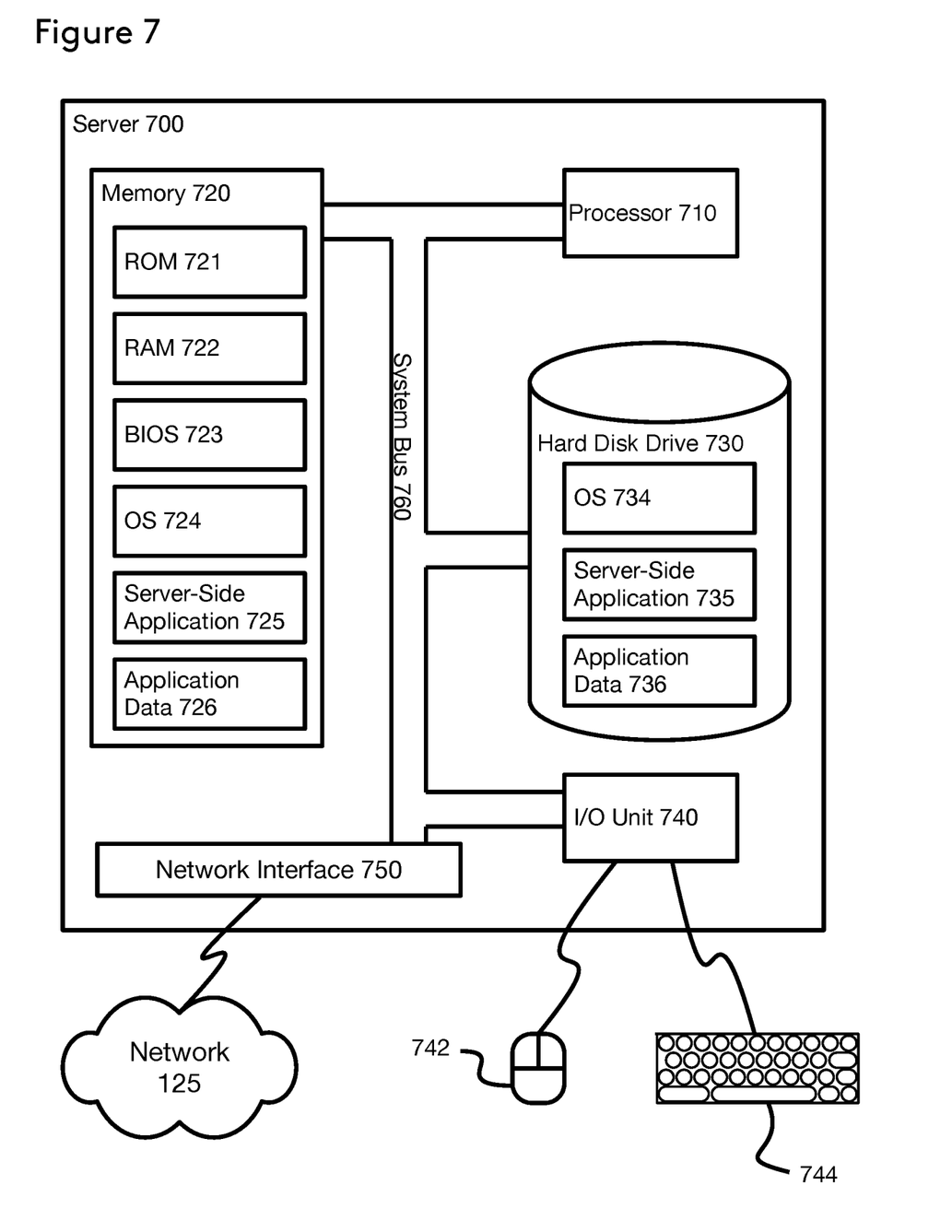
FIG. 7 illustrates an example of a server configured to perform the server functions described herein.

Turning to FIG. 7, a server 700, configured to perform backend server functions discussed above, is shown. Server 700 includes a processor 710, a memory 720, a hard drive 730, an I/O unit 740, and a network interface 750, all interconnected via system bus 760. System bus may be any type of bus architecture, including memory bus or memory controller, a peripheral bus, or a local bus using any of a variety of bus structure.

Processor 710 is any processor capable of interacting with the variety of components of server 700. In this regard, processor 910 may include a processor, multiprocessors, multicore processor, a dedicated controller, such as an ARM processor, an ASIC, or an FPGA, or any combination thereof.

Memory 720 is system memory that includes ROM 721, RAM 722, BIOS 723, OS 724, server-side application 725, and application data 726. The information stored in memory 720 is accessible by processor 710. In preferred embodiments, server-side application 725 is a secure collaboration application that allows users to participate in voice and video calls, share encrypted content, exchange encrypted communications, and share application data via the corresponding client-side application on the users' devices. Accordingly, the processes described above are performed by the secure collaboration application executing on server 700. In operation, the secure collaboration application and the hardware of server 700 operate in conjunction to perform the processes described herein. Accordingly, memory 720 may be any type of media capable of storing information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 720 may include short-term or temporary storage, as well as long-term or persistent storage.

Application data 726 includes a database that stores at least one of account information for one or more users, encrypted communications, etc. In preferred embodiments, application data 726 is encrypted via an encryption algorithm, such as Advanced Encryption Standard (AES), and a 256-bit key, referred to hereinafter as a server encryption key.

Hard disk drive 730 is a non-volatile memory configured to store operating system 734, server-side application 735, and application data 736 prior to being loaded into memory 720. In preferred embodiments, application data 736 is encrypted using a symmetric encryption algorithm and a server encryption key.

I/O unit 740 is configured to receive input from a user and output data to the user. As illustrated I/O unit 740 receives input from mouse 742 and keyboard 744. While mouse 742 and keyboard 744 are illustrated, a skilled artisan would appreciate that I/O unit 740 is capable of interacting with a plurality of different input and output devices, including touchpads, monitors, printers, etc. According to some embodiments, I/O unit 940 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Network interface 750 may be dedicated hardware, software, firmware, or any combination thereof that is configured to connect client device server 700 to network 125. In this regard, network interface 750 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 750 is configured to exchange data and information with a first, including the results of a verification of received login credentials, a token to access one or more second servers, and one or more components of the VOPRF exchange.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A method for securing a first encryption key for a first device in a system using external authentication, the method comprising:
   generating, by the first device, a blinded representation of a first secret using a first hash of the first secret;
   transmitting, from the first device, the blinded representation of the first secret to a first server;

receiving, at the first device, a first proof from the first server in response to the transmitted blinded representation of the first secret;
verifying, by the first device, the first proof received from the first server;
unblinding, by the first device, the blinded representation of the first secret;
generating, by the first device, a first key-encrypting key by applying a second hash to the first proof and the first hash of the first secret; and
encrypting, by the first device, the first encryption key using the first key-encrypting key, wherein the first encryption key encrypts data on the first device.

2. The method of claim 1, further comprising:
deleting, by the first device, the first key-encrypting key after the first encryption key is encrypted.

3. The method of claim 1, wherein generating the blinded representation of the first secret comprises:
generating, by the first device, the first secret;
generating, by the first device, a first blind;
generating, by the first device, a first hashed representation of the first secret by applying a first hashing algorithm to the first secret; and
generating, by the first device, the blinded representation of the first secret by combining the first blind and the first hashed representation of the first secret.

4. The method of claim 1, further comprising:
obtaining, by the first device, a first public key associated with the first server.

5. The method of claim 4, wherein verifying the first proof comprises:
verifying, by the first device, a first signature included in the first proof using the first public key associated with the first server.

6. The method of claim 1, wherein generating the first key-encrypting key comprises hashing the first secret with a second hashing algorithm.

7. A method for decrypting application data in an external authentication environment, the method comprising:
receiving, on a first device, login credentials;
transmitting, from the first device, the login credentials to a first server;
generating, by the first device, a blinded representation of a first secret by hashing the first secret;
transmitting, from the first device, the blinded representation of the first secret to the first server;
receiving, at the first device, a first token and a first proof from the first server;
verifying, by the first device, the first proof received from the first server;
unblinding, by the first device, the blinded representation of the first secret;
generating, by the first device, a first key-encrypting key by hashing the blinded representation of the first secret and the first proof from the first server;
decrypting, by the first device, a first encryption key using the first key-encrypting key;
decrypting, by the first device, application data using the first encryption key; and
accessing, by the first device, one or more applications on a second server using the first token and the decrypted application data.

8. The method of claim 7, wherein accessing the one or more applications on the second server comprises:
transmitting, from the first device, the first token to the second server.

9. The method of claim 7, further comprising:
encrypting, by the first device, the first encryption key when the first device ceases accessing the second server; and
deleting, by the first device, the first key-encrypting key after the first encryption key is encrypted.

10. The method of claim 7, wherein generating the first key-encrypting key comprises hashing the first secret with a second hashing algorithm.

11. A non-transitory computer-readable medium comprising instructions that, when executed by at least one processor, perform the steps of:
receiving, at a first server, a blinded representation of a first secret from a first device, wherein the blinded representation comprises a hash of the first secret;
generating, by the first server, a first proof using the blinded representation of the first secret; and
transmitting, from the first server, the first proof to the first device, wherein the first proof is hashed with the blinded representation of the first secret to generate a key-encrypting key used to encrypt a local encryption key of the first device as part of authenticating to the first server.

12. The non-transitory computer readable medium of claim 11, wherein the first proof is a non-interactive zero knowledge proof.

13. The non-transitory computer-readable medium of claim 11, further comprising instructions for:
receiving, at the first server, login credentials from the first device.

14. The non-transitory computer-readable medium of claim 13, further comprising instructions for:
transmitting, from the first server, the login credentials received from the first device to a second server;
receiving, at the first server, a first indication that the login credentials are valid from the second server; and
transmitting, from the first server, a first token to the first device in response to receiving the first indication that the login credentials are valid.

15. The non-transitory computer-readable medium of claim 14, further comprising instructions for:
receiving, at the first server, a request to validate the first token from a third server;
determining, by the first server, whether the first token received from the third server is valid; and
providing, by the first server, a second indication to the third server that the first token is valid in response to the determination that the first token is valid.

16. The non-transitory computer-readable medium of claim 11, further comprising instructions for:
generating, by the first server, a first signature of the first proof.

17. The non-transitory computer-readable medium of claim 16, wherein the first signature is generated using a first private key.

18. The non-transitory computer-readable medium of claim 16, further comprising instructions for:
transmitting, from the first server, the first signature to the first device with the first proof.

19. The method of claim 1, wherein the first server comprises a single sign-on service.

20. The method of claim 7, wherein the one or more applications comprises a secure collaboration application.

* * * * *